United States Patent [19]

Gartland et al.

[11] Patent Number: 5,160,383
[45] Date of Patent: Nov. 3, 1992

[54] TIRE HAVING IDENTIFICATION LABEL AFFIXED THERETO

[75] Inventors: Robert J. Gartland, Youngstown; William H. Thomson, Akron, both of Ohio

[73] Assignee: The Goodyear Tire & Rubber Company, Akron, Ohio

[21] Appl. No.: 583,102

[22] Filed: Sep. 17, 1990

[51] Int. Cl.⁵ .............................................. B60C 13/00
[52] U.S. Cl. .................................... 152/510; 152/524; 156/116
[58] Field of Search ............................ 156/110.1, 116; 152/450, 510, 512, 524, 525, DIG. 12, DIG. 16; 525/237; 40/587, 616

[56] References Cited

U.S. PATENT DOCUMENTS

| | | |
|---|---|---|
| 1,057,164 | 3/1913 | Messenger . |
| 1,544,262 | 6/1925 | Midgley . |
| 1,904,289 | 4/1933 | Neidich et al. . |
| 1,989,703 | 2/1935 | Leguillon ................................ 18/61 |
| 2,761,489 | 9/1956 | Kraft ..................................... 154/14 |
| 2,979,099 | 4/1961 | Rowe ..................................... 152/330 |
| 3,128,815 | 4/1964 | Nonnamaker . |
| 3,164,192 | 1/1965 | Kasio et al. . |
| 3,258,050 | 6/1966 | Nonnamaker . |
| 3,382,120 | 5/1968 | Rudder ................................. 156/116 |
| 3,439,083 | 4/1969 | Ugolini ................................. 264/139 |
| 3,449,201 | 6/1969 | Palmquist et al. ................... 161/164 |
| 3,480,065 | 11/1969 | Verdier . |
| 3,538,972 | 11/1970 | Yurcick ................................ 152/354 |
| 3,623,900 | 11/1971 | Jonnes et al. ........................ 117/9 |
| 3,631,913 | 1/1972 | Boileau ................................ 152/353 |
| 3,769,123 | 10/1973 | Botts .................................... 156/116 |
| 3,843,438 | 10/1974 | Gabriel ................................ 156/244 |
| 4,158,378 | 6/1979 | Pearson et al. ...................... 152/524 |
| 4,170,503 | 10/1979 | Buchanan et al. .................. 156/116 |
| 4,220,564 | 9/1980 | Tanimoto et al. .................... 260/5 |
| 4,224,268 | 9/1980 | Merli et al. ......................... 264/139 |
| 4,279,286 | 7/1981 | Merli et al. ......................... 152/353 |
| 4,413,663 | 11/1983 | Sullenger ............................ 152/353 |
| 4,442,618 | 4/1984 | Minter et al. ....................... 40/587 |
| 4,684,431 | 8/1987 | Shurman et al. ................... 156/394.1 |
| 4,790,365 | 12/1988 | Sandstrom et al. ................. 152/510 |
| 4,941,522 | 7/1990 | Sakurai ............................... 152/523 |
| 4,967,818 | 11/1990 | Gartland et al. .................... 152/524 |

FOREIGN PATENT DOCUMENTS

| | | |
|---|---|---|
| 212286 | 7/1986 | European Pat. Off. . |
| 212538 | 8/1986 | European Pat. Off. . |
| 213477 | 3/1987 | European Pat. Off. . |
| 213478 | 3/1987 | European Pat. Off. . |
| 249918 | 6/1987 | European Pat. Off. . |
| 0364391 | 4/1990 | European Pat. Off. . |
| 54-132907 | 10/1979 | Japan . |
| 55-152605 | 11/1980 | Japan . |
| 355037 | 10/1972 | U.S.S.R. . |
| 2006692 | 5/1979 | United Kingdom ................ 152/524 |

*Primary Examiner*—Geoffrey L. Knable
*Attorney, Agent, or Firm*—Alvin T. Rockhill

[57] ABSTRACT

For a wide variety of reasons, it would be desirable to affix identification labels, such as serial numbers, to tires. Such labels should be capable of lasting the entire life of the tire which may include being retreaded on multiple occasions. From a commercial standpoint, it is also very important for the label and the means of affixing it to the tire to be inexpensive. This invention discloses such a technique for affixing identification labels to tires. This information specifically relates to a method of preparing a pneumatic rubber tire having an outer circumferential tread, a supporting carcass therefor, two-spaced beads, two rubber sidewalls connecting said beads, and a rubber innerliner having an identification label affixed thereto, the process including the steps of (a) applying the identification label to the rubber innerliner of an uncured tire, wherein the identification label contains about 35 to about 90 weight percent syndiotactic 1,2-polybutadiene having a melting point which is within the range of about 70° C. to about 160° C. and about 10 to about 65 weight percent of at least one polydiene rubber which is cocurable with the syndiotactic 1,2-polybutadiene, sulfur, zinc oxide and at least one pigment or colorant; and (b) curing the tire. Labels containing virtually any type of information can be affixed utilizing this technical. For instance, the identification labels can include conventional numbers and/or letters, computer readable dot matrix identification, or a bar code.

18 Claims, No Drawings

TIRE HAVING IDENTIFICATION LABEL AFFIXED THERETO

BACKGROUND OF THE INVENTION

For a variety of reasons, it is useful to affix identification labels to tires. For instance, such identification labels could be used to determine the tire's date of manufacture, the plant in which it was built and even the tire building machine on which it was constructed. Identification labels could also be used in tracking the tire through its line of distribution to the ultimate purchaser.

It is important for a tire identification label to be highly durable. This is because it may be important to read the identification label after the tire has been in service on a vehicle for many years. Truck tires are frequently retreaded on multiple occasions and it is important for the identification label to be capable of surviving such retreading operations. It is also important for the identification label to be capable of being easily read. In many cases it will be important for the identification label to be capable of being read by a computer as well as human readable.

Identification labels are a tool which can be used to reduce delays and errors associated with transcribing information. Besides increasing productivity through automated factory sorting, identification labels make it possible to collect more detailed information with greater accuracy and minimal effort.

Conventional systems for affixing labels to tires have proven not to be totally satisfactory. For instance, labels are often affixed to the tread area of tires utilizing standard adhesives. However, such labels are not durable and are not intended to survive pass the point at which the tire is sold to the ultimate customer. Even though current technology exists for permanently affixing identification to tires, such techniques have not been widely implemented. For instance, serial numbers can be molded into tire sidewalls but such a procedure is highly labor intensive and costly. In any case, current technology does not provide an inexpensive means of applying durable identification labels to tires.

SUMMARY OF THE INVENTION

The present invention provides a relatively inexpensive means for permanently affixing identification labels to tires. These identification labels are capable of functioning over the entire life of a tire. These identification labels can contain standard numbers and/or letters which can be visually read by humans. The identification label can also be in the form of a bar code which is capable of being scanned and read by a computer. Another alternative is for the identification label to contain a dot matrix code which can either be read visually by humans or electronically via a computer.

The present invention specifically discloses a method of preparing a pneumatic rubber tire having an outer circumferential tread, a supporting carcass therefor, two-spaced beads, two rubber sidewalls connecting said beads, and a rubber innerliner having an identification label affixed thereto, said process comprising (a) applying the identification label to the rubber innerliner of an uncured tire, wherein the identification label is comprised of about 35 to about 90 weight percent syndiotactic 1,2-polybutadiene having a melting point which is within the range of about 70° C. to about 160° C. and about 10 to about 65 weight percent of at least one polydiene rubber which is cocurable with said syndiotactic 1,2-polybutadiene, sulfur, zinc oxide and at least one pigment or colorant; and (b) curing the tire.

The subject invention further reveals a pneumatic tire having an identification label affixed thereto which is comprised of an outer circumferential tread, a supporting carcass therefor, two-spaced beads, two rubber sidewalls connecting said beads, and a rubber innerliner: wherein the identification label is affixed to the rubber innerliner and wherein the identification label is comprised of from about 35 weight percent to about 90 weight percent syndiotactic 1,2-polybutadiene having a melting point which is within the range of about 70° C. to about 160° C. and from about 10 weight percent to about 65 weight percent of at least one polydiene rubber which is cocured with said syndiotactic 1,2-polybutadiene, and at least one pigment or colorant.

DETAILED DESCRIPTION OF THE INVENTION

In practicing this invention, standard uncured tires are built utilizing normal procedures. Such tires will typically be comprised of an outer circumferential tread, a supporting carcass therefor, two-spaced beads, two rubber sidewalls connecting said beads, and a rubber innerliner. Such tires can be standard black wall tires or decorative white wall tires. In any case, the uncured tire which is utilized is built employing standard procedures which are well known to persons skilled in the art of building tires.

In the practice of this invention, the identification label is affixed to the innerliner of the uncured tire before it is vulcanized (cured). The tire is then cured in a mold utilizing standard curing procedures. It is believed that the syndiotactic 1,2-polybutadiene (SPBD) and the diene rubbers in the identification label cocured with the rubber of the innerliner. In any case, the identification label becomes very strongly and permanently affixed to the tire innerliner. Because the identification label is affixed to the inside of the tire, abrasion of the identification label during normal tire operations is not a problem.

The syndiotactic 1,2-polybutadiene used in the practice of the subject invention normally has more than 65% of its monomeric units in a syndiotactic 1,2-configuration. SPBD can be prepared in an inert organic solvent utilizing the technique described in U.S. Pat. No. 3,901,868 or in an aqueous medium utilizing the process described in U.S. Pat. No. 4,506,031. U.S. Pat. No. 4,506,031 more specifically reveals a process for producing polybutadiene composed essentially of SPBD comprising the steps of:

(A) preparing a catalyst component solution by dissolving, in an inert organic solvent containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula $AlR_3$, wherein R represents a hydrocarbon radical of 1 to 6 carbon atoms:

(B) preparing a reaction mixture by mixing said catalyst component solution with a 1,3-butadiene/water mixture containing desired amounts of said 1,3-butadiene:

(C) preparing a polymerization mixture by mixing carbon disulfide throughout said reaction mixture, and (D) polymerizing said 1,3-butadiene in said polymerization mixture into polybutadiene while agitating said polymerization mixture. In the process described therein the crystallinity and melting point of the SPBD can be controlled by adding alcohols, ketones, nitriles, aldehydes or amides to the polymerization mixture.

The SPBD utilized in making the identification labels for tires has a melting point which is within the range of about 70° C. to 160° C. It is generally preferred for the SPBD utilized in making identification labels for passenger car or truck tires to have a melting point which is within the range of about 80° C. to about 150° C. with a melting point which is within the range of 90° C. to 125° C. being most preferred. The melting points referred to herein are the minimum endotherm values determined from DSC (differential scanning calorimetry) curves.

The compositions utilized in making the identification labels of this invention is a blend which is comprised of SPBD and at least one rubber which is cocurable with the SPBD. The rubber used in such blends can be virtually any type of elastomer which contains unsaturation that allows for sulfur curing. Typically, the elastomer will be one or more polydiene rubbers. Some representative examples of suitable polydiene rubbers include cis-1,4-polybutadiene, natural rubber, synthetic polyisoprene, styrene butadiene rubber, EPDM (ethylene-propylene-diene monomer) rubbers, isoprene-butadiene rubbers, and styrene-isoprene-butadiene rubbers. In many cases it will be desirable to utilize a combination of diene rubbers in the blend. For instance, the rubber portion of the blend can be a combination of chlorobutyl rubber, natural rubber, and EPDM rubber. It is particularly preferred to utilize a combination which contains from about 30 weight percent to about 80 weight percent chlorobutyl rubber, from about 15 weight percent to about 55 weight percent natural rubber, and from about 2 weight percent to about 10 weight percent EPDM rubber as the rubber component in such blends. A rubber composition which contains from about 55 weight percent to about 65 weight percent chlorobutyl rubber, from about 25 weight percent to about 45 weight percent natural rubber, and from about 3 weight percent to about 7 weight percent EPDM rubber is more highly preferred.

The blend utilized in preparing the identification labels will normally contain from about 35 weight percent to about 90 weight percent SPBD and from about 65 weight percent to about 10 weight percent elastomers which are cocurable with the SPBD. The inclusion of high levels of SPBD results in better adhesion, abrasion, and tear resistance for the cured material. High levels of SPBD also result in increased green strength and stiffness. Additionally, the use of high levels of SPBD reduces green tack which makes handling easier and allows for stacking without the use of a substrate. However, the incorporation of large amounts of SPBD into the blend also results in reduced flexibility and modulus. Accordingly, for the best balance of overall properties, the blend utilized will contain from about 50 weight percent to about 85 weight percent SPBD and from about 50 weight percent to about 15 weight percent cocurable rubbers. The blends which are most highly preferred will contain from about 65 weight percent to about 80 weight percent SPBD and from about 35 weight percent to about 20 weight percent of the elastomeric component.

The SPBD used in making the blends from which the identification labels are formed is generally incorporated into the blend in powder or pellet form. In other words, the SPBD is in the form of a powder or pellet at the time it is compounded with the rubber component utilized in making the blend of which the identification label is comprised.

The SPBD powder or pellets can be mixed into the rubber component utilizing standard mixing techniques. However, the mixing is normally carried out at a temperature which is at least as high as the melting point of the SPBD being utilized. During the mixing procedure, the SPBD is fluxed into the rubber with additional desired compounding ingredients. Such mixing is typically carried out in a Banbury mixer, a mill mixer or in some other suitable type of mixing device.

In an alternative embodiment of this invention, the blend utilized in preparing the identification label is prepared by inverse phase polymerization. For example, a blend of SPBD with cis-1,4-polybutadiene can be prepared in an organic solvent by inverse phase polymerization. In such a procedure, the cis-1,4-polybutadiene is first synthesized in an organic solvent under solution polymerization conditions. This polymerization can be catalyzed by using a variety of catalyst systems. For instance, a three component nickel catalyst system which is comprised of an organoaluminum compound, a soluble nickel containing compound and a fluorine containing compound can be utilized to catalyze the polymerization. Such a polymerization can also be catalyzed by utilizing rare earth catalyst systems, such as lanthanide systems, which are normally considered to be "pseudo-living". Such rare earth catalyst systems are normally comprised of three components which include (1) an organoaluminum compound, (2) an organometallic compound which contains a metal from Group III-B of the Periodic System, and (3) at least one compound which contains at least one labile halide ion. Metals from Group I and II of the Periodic System can also be utilized as catalysts for polymerizing 1,3-butadiene monomer into cis-1,4-polybutadiene. The metals which are most commonly utilized in such initiator systems include barium, lithium, magnesium, sodium and potassium with lithium and magnesium being the most commonly utilized. The cis-1,4-polybutadiene cement which is synthesized is then subsequently utilized as the polymerization medium for the synthesis of the SPBD. It will generally be desirable to add additional 1,3-butadiene monomer to the cis-1,4-polybutadiene cement for the synthesis of the SPBD. In some cases, it will also be desirable to add additional solvent. The amount of monomer added will be contingent upon the proportion of SPBD desired in the blend being prepared. It will, of course, also be necessary to add a catalyst system to the rubber cement which is capable of promoting a polymerization which results in the formation of SPBD. A detailed description of such catalyst systems is given in U.S. Pat. No. 3,778,424 which is herein incorporated by reference in its entirety.

The blend of SPBD and rubber will also contain other standard rubber chemicals. For instance, such blends will additionally contain sulfur, zinc oxide, and at least one desired colorant or pigment. They will also typically contain other rubber chemicals, such as antioxidants, accelerators, oils, and waxes in conventional amounts. For instance, the SPBD/rubber blend will normally contain from about 0.2 to about 8 phr of sulfur. It is generally preferred for the blend to contain from about 0.5 to 4 phr of sulfur with it being most preferred for such blends to contain from 1 to 2.5 phr of sulfur. A primary accelerator is generally also present at a concentration which is within the range of about 0.1 to about 2.5 phr. It is normally preferred for the primary accelerator to be present at a concentration which is within the range of about 0.2 to about 1.5 phr with it being most preferred for the primary accelerator to be at a concentration of 0.3 to 1 phr. Secondary accelerators will also commonly be utilized at a concentration which is within the range of about 0.02 to about 0.8 phr. Secondary accelerators are preferably utilized at a concentration of 0.05 to 0.5 phr with the utilization of 0.1 to 0.3 phr of a secondary accelerator being most preferred. Such SPBD/rubber blends will typically contain from about 1 to about 10 phr of various processing oils and it is generally preferred for such blends to contain from about 2.5 to about 7.5 phr of processing oils. The SPBD/rubber blend will generally contain from about 25 phr to about 100 phr of various fillers such as clay and/or titanium dioxide. It is normally preferred for such blends to contain from about 40 phr to about 80 phr fillers. It should be noted that titanium dioxide acts as both a filler and a white pigment. Some representative examples of colorants that can be utilized in the SPBD/rubber blend to impart desired colors to the identification labels include diarylid yellow 17, pththalocy blue 15, diarylid orange 13, and perm red 2B (red 48:1).

After the SPBD/rubber blend has been compounded as desired, it is processed into the desired identification label. A wide variety of techniques can be utilized in making the identification label. For instance, desired numbers or letters can be simply cut from a sheet of the SPBD/rubber blend. Such numbers and/or letters can then be affixed to the tire innerliner prior to curing the tire.

In a preferred embodiment of this invention, the identification labels are punched from a film of the SPBD/rubber blend. This can be accomplished by utilizing an electronically activated mechanical punching assembly in which dot matrices are punched from a film or tape of the SPBD/rubber blend and transferred to a strip of uncured innerliner. The uncured innerliner is typically comprised of the same rubber as is used in building the tire being labelled. The innerliner will typically be comprised of a halobutyl rubber, such as chlorobutyl rubber or a bromobutyl rubber. The tape or film from which the dot matrices are punched will typically be from about 5 mils to about 20 mils thick. It is generally preferred for the SPBD/rubber film or tape to have a thickness which is within the range of about 6 mils to about 14 mils with it being most preferred for the film or tape to have a thickness which is within the range of about 8 mils to about 12 mils. The innerliner strip to which the dot matrices are transferred are typically from about 25 mils to about 50 mils thick and are preferably from about 30 mils to about 40 mils thick.

The label strips are preferably affixed to the rubber innerliner of the uncured tire mechanically. However, the identification labels can be manually applied to the rubber innerliner in the inside of the uncured tire mechanically. This can be done by simply pushing the identification label against the innerliner and then subsequently curing the tire under conditions of heat and pressure utilizing normal curing procedures.

The present invention will be described in more detail in the following examples. These examples are merely for the purpose of illustrating the subject invention and are not to be regarded as limiting the scope of the subject invention or the manner in which it can be practiced. Unless specifically indicated otherwise, all parts and percentages are given by weight.

EXAMPLE 1

A SPBD/rubber blend containing 67 weight percent SPBD, 20 weight percent chlorobutyl rubber, 12 weight percent natural rubber and 1 weight percent EPDM rubber, based upon total polymers, was prepared using conventional Banbury mixing procedures for non-productive and productive batches. The SPBD/rubber blend also contained 2.50 phr of processing oils, 1.0 phr of antioxidants, 1.0 phr of stearic acid, 18.3 phr of clay, 35.0 phr of titanium dioxide, 0.067 phr of a blue pigment, 5.0 phr of zinc oxide, 1.2 phr of sulfur, and 1.54 phr of an accelerator. The SPBD utilized in this example had a melting point of 123° C. It should be noted that the SPBD utilized in accordance with this invention is a crosslinking thermoplastic resin. However, SPBD is considered to be a rubber in calculating phr (parts per hundred parts of rubber).

The SPBD/rubber blend was then calendared and slit into rolls of tape. The tape made had a width of about 1.25 inches and had a thickness which was within the range of about 8 mils to about 10 mils. The laboratory calendar was operated utilizing a mill temperature of 270° F., a top roll temperature 265° F., a middle roll temperature of 260° F., and a bottom roll temperature of 80° F. The rolls of tape made had a diameter of 11.5 to 12.0 inches and the tape could be let-off with minimum effort. The rolls of tape made contained approximately 1,000 feet of tape and weighed about 5.7 lbs. Each roll contained enough tape to make about 1,200 labels.

An electronically activated mechanical punching assembly was utilized to punch dot matrices from the SPBD/rubber tape. The dot matrices were transferred to uncured butyl rubber strips. The labels made contained 10 digit numeric codes. Each number was formed by 1/8 inch diameter white dots in a 5×4 array. The numbers were verified after application by a vision scanning/computer interface set-up. The resulting position of the label after the green tire is built is circumferentially inside the tire.

The dot matrix labels were applied to the innerliner of 12 different styles of tires each of which was built in 4 different sizes. These tires were cured utilizing standard factory procedures. The dot matrix codes in the tires were then read. The reader consisted of a line scan camera that was placed inside the center of the tires which were rotated 1.5 turns. The camera, which had an infinite focal length, captured the image of the dot matrices for computer processing. The computer detected the position of each dot in the matrix and decoded it into the corresponding numeral. The reader stations sensed the height and diameter of the tires which controlled the probe depth, centering and light intensities.

The dot matrices uniformly spaced upon tire shaping, cocured to the tire innerliner which provided excellent adhesion, and maintained excellent dot definition after curing. The dot matrix patterns in the tires exhibited good light reflectants for reading by the vision system.

In fact, the tires built were read during these trials at an accuracy rate of 99.992 percent. Additionally, the quality and uniformity of the tires built utilizing this procedure was not sacrificed in any way. This example clearly shows that the technique of this invention is an effective and reliable means for permanently affixing identification labels to tires.

EXAMPLE 2

A SPBD/rubber blend containing 80 weight percent SPBD, 12 weight percent chlorobutyl rubber, 7 weight percent natural rubber and 1 weight percent EPDM rubber, based upon total polymers, was prepared using conventional Banbury mixing procedures for non-productive and productive batches. The SPBD/rubber blend also contained 1.50 phr of processing oils, 1.0 phr of antioxidants, 1.0 phr of stearic acid, 11.0 phr of clay, 3.0 phr of titanium dioxide, 0.04 phr of a blue pigment, 5.0 phr of zinc oxide, 1.2 phr of sulfur, and 1.54 phr of an accelerator. The SPBD utilized in this example had a melting point of 87° C. It should be noted that the SPBD utilized in accordance with this invention is a crosslinking thermoplastic resin. However, SPBD is considered to be a rubber in calculating phr (parts per hundred parts of rubber).

The SPBD/rubber blend was then calendared and slit into rolls of tape. The tape made had a width of about 1.25 inches and had a thickness which was within the range of about 8 mils to about 10 mils. The laboratory calendar was operated utilizing a mill temperature of 240° F., a top roll temperature 235° F., a middle roll temperature of 230° F., and a bottom roll temperature of 80° F. The rolls of tape made had a diameter of 11.5 to 12.0 inches and the tape could be let-off with minimum effort. The rolls of tape made contained approximately 1,000 feet of tape.

The method of preparing the labels and affixing to the tires are the same as discussed in Example 1.

SPBD imparts properties to green rubber that are desirable for improved handling characteristics for in mold applied white sidewall rings. The addition of SPBD having a melting point of 123° C. or 87° C. at any level results in reduced tack, increased stiffness, and increased static modulus for green stocks. In this series of experiments, various levels of SPBD were blended with a rubber blend containing 60% chlorobutyl rubber, 35% natural rubber and 5% EPDM rubber. The physical properties of the uncured SPBD/rubber films made are reported in Table I.

TABLE I

| Example | 1 | 2 | 3 |
|---|---|---|---|
| SPBD Level | 67 | 80 | 0 |
| SPBD MP 123° C. phr | 67 | — | — |
| SPBD MP 87° C. phr | — | 80 | — |
| Physical Properties for Green Film | | | |
| Tensile, psi | 1400 | 1900 | 145 |
| Elongation, % | 510 | 660 | >900 |
| 50% Modulus, psi | 750 | 600 | 65 |
| Crescent Tear, ppi | 260 | 295 | — |

Example 3 was done as a control and did not include any SPBD. Tensile strength and elongation were determined by ASTM D-412. Crescent tear was determined by ASTM D-1004. As can be seen, the incorporation of SPBD into the rubber blend yields high green strength and stiffness without the need for precure.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having an identification label affixed thereto which is comprised of an outer circumferential tread, a supporting carcass therefor, two-spaced beads, two rubber sidewalls connecting said beads, and a rubber innerliner: wherein the identification label is affixed to the rubber innerliner and wherein the identification label is comprised of from about 35 weight percent to about 90 weight percent syndiotactic 1,2-polybutadiene having a melting point which is within the range of about 70° C. to about 160° C. and from about 10 weight percent to about 65 weight percent of at least one polydiene rubber which is cocured with said syndiotactic 1,2-polybutadiene, sulfur, zinc oxide, and at least one pigment or colorant.

2. A method of preparing a pneumatic rubber tire having an outer circumferential tread, a supporting carcass therefor, two-spaced beads, two rubber sidewalls connecting said beads, and a rubber innerliner having an identification label affixed thereto, said process comprising (a) applying the identification label to the rubber innerliner of an uncured tire, wherein the identification label is comprised of about 35 to about 90 weight percent syndiotactic 1,2-polybutadiene having a melting point which is within the range of about 70° C. to about 160° C. and about 10 to about 65 weight percent of at least one polydiene rubber which is cocurable with said syndiotactic 1,2-polybutadiene, sulfur, zinc oxide, and at least one pigment or colorant: and (b) curing the tire.

3. A pneumatic tire as specified in claim 1 wherein the polydiene rubber is cis-1,4-polybutadiene.

4. A pneumatic tire as specified in claim 1 wherein the polydiene rubber is styrene-butadiene rubber.

5. A pneumatic tire as specified in claim 1 wherein the polydiene rubber is natural rubber or synthetic polyisoprene.

6. A pneumatic tire as specified in claim 1 wherein the polydiene rubber is a blend of a halobutyl rubber, natural rubber, and an EPDM rubber.

7. A pneumatic tire as specified in claim 6 wherein the halobutyl rubber is a chlorobutyl rubber.

8. A pneumatic tire as specified in claim 7 wherein the polydiene rubber is comprised of from about 30 to about 80 weight percent chlorobutyl rubber, from about 15 to about 55 weight percent natural rubber, and from about 2 to about 10 weight percent EPDM rubber.

9. A pneumatic tire as specified in claim 8 wherein the identification label is comprised of from about 50 weight percent to about 85 weight percent syndiotactic 1,2-polybutadiene.

10. A pneumatic tire as specified in claim 9 wherein the polydiene rubber is comprised of from about 55 weight percent to about 65 weight percent chlorobutyl rubber, from about 25 weight percent to about 45 weight percent natural rubber, and from about 3 weight percent to about 7 weight percent EPDM rubber.

11. A pneumatic tire as specified in claim 10 wherein said identification label is comprised of from about 65 weight percent to about 80 weight percent syndiotactic 1,2-polybutadiene.

12. A pneumatic tire as specified in claim 11 wherein the melting point of the syndiotactic 1,2-polybutadiene is within the range of about 80° C. to about 150° C.

13. A pneumatic tire as specified in claim 11 wherein the melting point of the syndiotactic 1,2-polybutadiene is within the range of about 90° C. to about 125° C.

14. A pneumatic tire as specified in claim 11 wherein the pigment or colorant is titanium dioxide.

15. A pneumatic tire as specified in claim 1 wherein the identification label is in the form of a dot matrix.

16. A pneumatic tire as specified in claim 1 wherein the identification label is in the form of a bar code.

17. A method as specified in claim 2 wherein the syndiotactic 1,2-polybutadiene has a melting point which is within the range of about 80° C. to about 150° C.

18. A method as specified in claim 2 wherein the identification label contains titanium dioxide as a pigment.

* * * * *